United States Patent [19]

Handwerker

[11] Patent Number: 5,855,978
[45] Date of Patent: Jan. 5, 1999

[54] CONCRETE CURE BLANKET HAVING INTEGRAL HEAT REFLECTIVE MEANS

[75] Inventor: Gary Handwerker, Northfield, Ill.

[73] Assignee: Midwest Canvas Corp., Chicago, Ill.

[21] Appl. No.: 857,660

[22] Filed: May 16, 1997

[51] Int. Cl.$^6$ .................................. B32B 3/00; B32B 1/04
[52] U.S. Cl. ........................................ 428/57; 428/75
[58] Field of Search .................................. 428/57, 73

[56] References Cited

U.S. PATENT DOCUMENTS 4,485,137  11/1984  White .
5,549,956   8/1996  Handwerker .

Primary Examiner—Johann Richter
Assistant Examiner—Joseph Murray
Attorney, Agent, or Firm—Sonnenschein Nath & Rosenthal

[57] ABSTRACT

A lightweight multilayer heat reflective concrete cure blanket having a moisture-impervious top outer layer, a moisture impervious bottom outer layer, and the top and bottom layers sealingly connected to each other at the boundaries of the layers to form a moisture impervious chamber between the first and second layers. The chamber includes at least one insulative layer therein, and a heat reflective material is applied to an outer surface of the bottom layer to reflect heat emanating from the concrete when the blanket is placed over the concrete. A protective heat permeable layer is applied over the heat reflective material to protect the heat reflective material from chemicals and dirt in the concrete. In a further embodiment, a second heat reflective material is applied to an inner surface of the upper layer to reflect additional heat which radiates from the concrete through the insulative layer and back towards the concrete.

13 Claims, 3 Drawing Sheets ly, multilayer, moisture-impervious concrete cure blanket hav-
5,855,978

CONCRETE CURE BLANKET HAVING INTEGRAL HEAT REFLECTIVE MEANS

BACKGROUND OF THE INVENTION

This invention is related to blankets for curing concrete and the like, and more particularly to a lightweight, multilayer, moisture-impervious concrete cure blanket having one or more integral heat reflective layers which facilitate the reflection of heat radiating from the curing concrete back toward the concrete.

One of the usual requirements in producing quality concrete is the proper manipulation of the concrete during curing. Curing not only increases the strength of concrete and its structural value, but proper curing during the curing period is mandatory for the production of water-tight and durable concrete. During the concrete curing process, chemical changes occur in the presence of water which ensure that the hardened concrete will be water-tight and durable over time, resulting in a stable and sturdy cured physical structure. These chemical changes occur over a considerable period of time requiring that the concrete be kept wet after it has set during the curing period. However, one problem is that the heat radiating from the concrete during the curing process evaporates the moisture in the concrete, thereby inhibiting the chemical hardening process and compromising the strength and durability of the cured concrete.

It is therefore necessary to contain the heat and moisture in the concrete long enough to permit the curing process to be sufficiently completed. Not surprisingly, the need for heat and moisture retention increases during cold weather applications. With decreasing temperatures, the need for increased thermal retention requires the use of additional layers of insulation resulting in concrete cure blankets of greater thickness which are heavy and cumbersome to use. It would be advantageous to have a lightweight multilayer moisture-impervious heat reflective concrete cure blanket that is capable of providing enhanced thermal resistance without a corresponding increase in the thickness or weight of the blanket.

Conventional moisture-impervious concrete cure blankets use foam, Fiberglass, air filled bubble layers, and like materials as insulation. However, such blankets are susceptive to accidental rips, and in the event the interior insulation gets wet, the insulting quality of the insulation material is reduced. Another method to keep the curing concrete moist utilizes frequent sprinklings, but this approach is labor intensive and expensive. To promote curing, horizontal concrete surfaces are usually covered by sand, canvas or burlap to maintain the desired dampness. But irregular and/or vertical concrete surfaces cannot be adequately covered and have to be sprinkled periodically to maintain the required damp condition. Concrete cure blankets are typically used to cover water-wetted concrete to extend the duration of the damp condition for as long as possible. It would be advantageous in the art to have a lightweight and durable, multilayer, moisture-impervious, heat reflective concrete cure blanket having enhanced thermal resistance and which is also universal in use in that it can be used for curing either horizontal or vertical concrete structures regardless of size.

One prior art attempt to solve this problem is taught by U.S. Pat. No. 5,549,956 to Handwerker, the present inventor, titled "Heat Reflective Blanket" which is directed to a flexible, multilayer heat reflective blanket containing at least one interior heat reflective, (i.e., a metal foil) layer, and at least one interior insulative layer. It has been discovered that a heat reflective concrete cure blanket configured to include an insulative layer as well as a heat reflective layer improves and enhances the effectiveness of the blanket, thereby making the blanket more efficient for its intended use. While the blanket disclosed in U.S. Pat. No. 5,549,956 satisfactorily enhances the concrete curing process, the configuration of this type of concrete cure blanket is somewhat expensive. It would be an advantage in the art if a lightweight, multilayer, moisture-impervious, heat reflective concrete cure blanket could be manufactured inexpensively, and yet also be durable and long-lasting.

Another approach to solve the above problems is taught by U.S. Pat. No. 4,485,137 to White titled "Concrete Curing Blanket" which is directed to a lightweight summer concrete cure blanket which improves water retention in the curing concrete irrespective of the surface irregularities present in the concrete. The cure blanket provides for effective water wicking or capillary wetting action characteristics across the entire blanket. The concrete cure blanket can be easily sealed with adjacent blankets to provide continuous coverage of a large area of curing concrete without tearing the blankets. This concrete cure blanket has a nonporous surface layer of a low density polyethylene that is heat sealed as a coating upon a batting layer of a porous, resilient, nonwoven, needle-punched, synthetic fabric such as polypropylene or other commercially available polymeric filament fabric. While having a porous exterior surface layer, the opaque surface layer of this concrete cure blanket will block visible sunlight and UV radiation. However, this concrete cure blanket is not suitable for winter concrete curing utilization, since the prior art blanket cannot reflect the heat radiating from the curing concrete, and the evaporation of moisture from the curing concrete remains a continuous operational problem thereby requiring rewetting of the curing concrete from time to time as needed during the curing period. It would be an advantage in the art if a lightweight, multilayer, moisture-impervious heat reflective concrete cure blanket were available to the construction industry.

The initial costs associated with the various concrete cure blankets contained in the prior art make such blankets expensive to acquire. It would be an advantage in the art if a lightweight, multilayer, moisture-impervious, concrete heat reflective cure blanket could be manufactured relatively inexpensively and easy to maintain by utilizing long-lasting thermoplastic films having a relatively small thickness.

The present invention overcomes these and other problems that are inherent with existing multilayer and other concrete cure blankets. The present invention combines lightweight moisture-impervious, film-like outer layers with at least one insulative layer, and at least one heat reflective layer associated with one or both of the outer layers to reflect heat back to the concrete, thereby maintaining or improving the blanket's effective thermal resistance without increasing the weight or thickness of the blanket.

SUMMARY OF THE INVENTION

A principal object of the present invention is to provide a lightweight multilayer moisture-impervious heat reflecting concrete cure blanket that exhibits enhanced thermal resistance without a corresponding increase in the thickness and/or weight of the blanket.

Another object of the present invention is to provide a lightweight multilayer moisture-impervious heat reflecting concrete cure blanket that exhibits enhanced thermal resistance of the blanket by utilizing at least one heat reflective surface which reflects the heat radiating from curing concrete back toward the concrete.

A further object of the present invention is to provide a lightweight multilayer moisture-impervious heat reflecting concrete cure blanket that exhibits enhanced thermal resistance of the blanket by utilizing at least one heat reflective surface, which reflects the heat radiating from curing concrete back toward the concrete, in combination with at least one insulative layer forming part of the blanket.

A further object of the present invention is to provide a lightweight multilayer moisture-impervious heat reflecting concrete cure blanket that exhibits enhanced thermal resistance of the blanket by utilizing a plurality of heat reflective surfaces that reflect the heat radiating from curing concrete back toward the concrete.

A further object of the present invention is to provide a lightweight multilayer moisture-impervious heat reflecting concrete cure blanket that exhibits enhanced thermal resistance of the blanket by utilizing at least one heat reflective surfaces which reflects the heat radiating from curing concrete back toward the concrete, in combination with a plurality of insulative layers forming part of the blanket.

A further object of the present invention is to provide a lightweight multilayer moisture-impervious heat reflecting concrete cure blanket that retards the rate of moisture evaporation occurring in the curing concrete by reflecting the heat radiating from the curing concrete back toward the concrete.

A still further object of the present invention is to provide a lightweight multilayer moisture-impervious heat reflecting concrete cure blanket that is easy and inexpensive to manufacture, durable and long-lasting, and easy to maintain.

In accordance with a preferred embodiment of the present invention, there is provided a lightweight multilayer concrete cure blanket, the blanket having associated heat reflective elements associated with one or both outside moisture-impervious layers, the blanket comprising:

a film-like moisture impervious first top outer layer; a film-like moisture impervious second bottom outer layer; the first and second layers sealingly connected to each other at the boundaries of the two layers to form a moisture impervious chamber between the first and second layers; at least one heat insulative layer disposed in the chamber between the first and second layers, and a heat reflective material applied to an outer surface of the second bottom outer layer to reflect heat emanating from the concrete when the blanket is placed over curing concrete; and a protective heat permeable layer over the heat reflective coat to protect the heat reflective material from chemicals and dirt in the concrete. In a further embodiment, a second reflective material is applied to a surface of the first top outer layer, which surface faces the concrete, to reflect a portion of the heat radiating from the concrete back towards the concrete.

These and other objects and advantages of the present invention will be set forth in the following description of the preferred embodiments in connection with the drawings, the disclosure, and the appended claims, wherein like reference numerals represent like elements throughout.

DESCRIPTION OF THE PREFERRED EMBODIMENT

In accordance with the present invention, a lightweight, multilayer, heat reflective concrete cure blanket is described that provides distinct advantages when compared to those of the prior art. The invention can best be understood with reference to the accompanying drawing figures.

Figure 1:
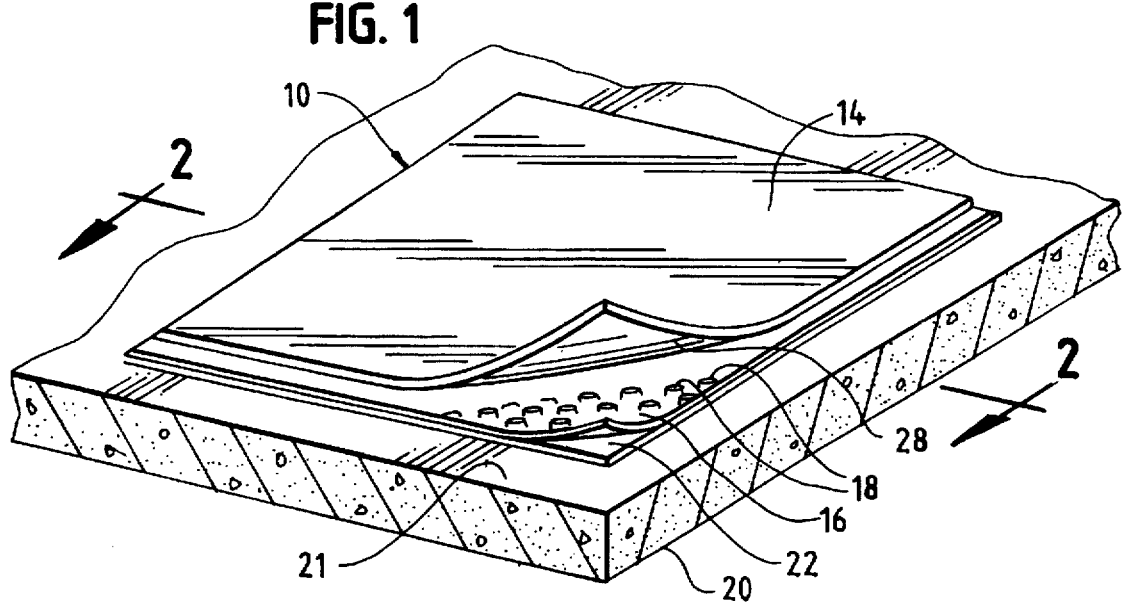
FIG. 1 is a perspective view of one embodiment of the lightweight, multilayer, heat reflective concrete cure blanket of the present invention disposed on top of a concrete slab.

FIG. 1 is a perspective view of one embodiment of a lightweight, multilayer, heat reflective concrete cure blanket 10 that is constructed in accordance with the present invention disposed on top of a wet curing concrete structure or slab 20 which is in a curing stage and has an associated surface 21. In FIG. 1, this embodiment of the cure blanket 10, while it may have any shape and size, is customarily fabricated from a plurality of laterally disposed panels suitably fastened together, each panel having a width of approximately 6 feet and a length of several tens of feet (i.e., twenty-five feet or more). The cure blanket 10 is usually rectangular in shape and possible alternative embodiments include square, circular, or custom designed shapes for specific site applications, and can be conveniently rolled-up for easy handling, transport to different job sites, and storage whenever required. The blanket 10 is lightweight (e.g., about six ounces per square yard without an insulation layer), flexible and pliable, long-lasting and durable. The cure blanket 10 is easy to clean, relatively maintenance free, resists tearing during use, and under expected operating conditions the blanket is reusable for many years.

To produce a uniform concrete cure blanket 10, the blanket is manufactured using conventional thermoplastic hot melt extrusion manufacturing practices for woven polyethylene fabrics and/or films and an associated heat sealed film coating that are common and well understood by those in the thermoplastic industry. The cure blanket 10, as illustrated in FIG. 1, is formed of a moisture-impervious top outer layer 14, at least one insulative layer 16, and a moisture-impervious bottom outer layer 22.

Figure 2:
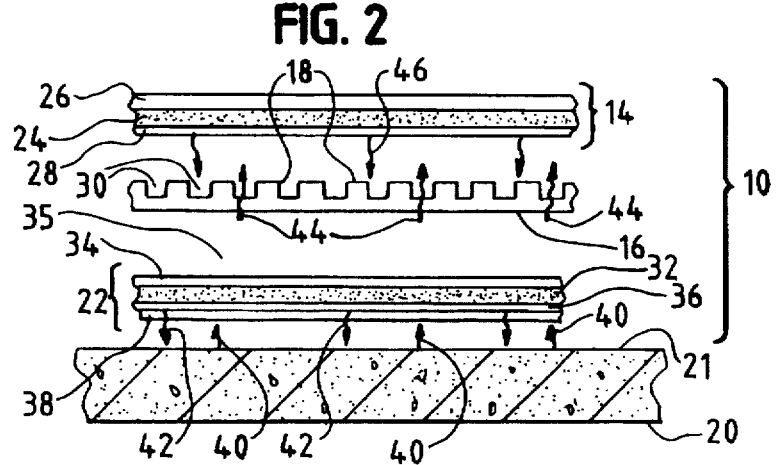
FIG. 2 a partial expanded cross-sectional view taken through line 2—2 of FIG. 1.

In the first embodiment of the present invention as seen in FIG. 2, top layer 14 comprises a film-like "woven" polyethylene fabric layer 24 made of columns of polyethylene strips approximately 0.375 inch wide interlaced with rows of transversely disposed polyethylene strips. For example, each strand of polyethylene fabric, approximately ⅛ inch wide or any other selected width, interlaces at roughly a right angle with an intersecting strand of polyethylene fabric, approximately ⅛ inch wide or any other selected width. The width of the weave for the woven polyethylene fabric is a variable and can be changed to other alternatives which are commercially available. The resulting woven polyethylene fabric is strong, flexible, and light in weight.

The particular type of woven polyethylene fabric used in the illustrated embodiment for layer 24 is a high tensile HDPE fabric and is commercially available under the following technical data specification, namely, under the registered trademark LORETEX, manufactured by Loretex Corporation of Guilderland Center, N.Y. 12065. This type of woven polyethylene fabric is commonly referred to as 5×4 (e.g., 5 strands in the horizontal direction and 4 strands in the vertical direction). The woven polyethylene fabric is available in numerous colors, as well as numerous patterns of weave (e.g., 5 by 5, 7 by 10, 10 by 10, 12 by 12).

In the preferred embodiment, when the concrete cure blanket 10 is properly used, the bottom outer layer 22 will be in continuous contact with the surface 21 of the wet curing concrete slab 20. The bottom layer 22 of the cure blanket 10 has a smooth surface, as will be explained in more detail which enables the blanket to remain somewhat slippery when wet and not adhere to the curing concrete 20 nor leave any marks, mars, indentions, or other impressions on the associated concrete surface 21. The multiple layers comprising the concrete cure blanket 10 are preferably joined or seamed using conventional methods such as stitching, heat sealing, buttons, or are otherwise effectively sealed along the edges of the blanket and/or within the body of the blanket in a suitable and effective pattern. The peripheral edges of the cure blanket 10 can be securely fastened, or otherwise effectively sealed, and provided with a grommet and rope attachment (not shown) for use with vertical, sloping or highly irregular concrete structures.

In the embodiment of the invention illustrated in FIG. 2, the top outer layer 14 of blanket 10 includes woven polyethylene layer 24 covered by a thin surface or coating 26 of polyethylene, which coating may be white, black, or any other color. The coating 26 of polyethylene and the woven polyethylene layer 24 are heat sealed together to provide moisture resistance and strength to the blanket 10.

The underside of top outer layer 14 comprises a reflective surface 28 of aluminum or other suitable reflective material, approximately one mil or less thickness, and evenly spread over the under surface of woven polyethylene layer 24. The surface 28 provides a heat reflective surface on the underside of top outer layer 14, as will be explained.

In the manufacture of the top outer layer 14 with its reflective aluminized surface 28 a web of woven polyethylene substrate is fed into a vacuum chamber. The chamber is sealed and a vacuum is drawn in the chamber to $10^{-4}$ torr. Metal elements in the bottom of the vacuum chamber are heated to approximately 1500° C., and a spool of thin aluminum wire is fed to the heated metal elements in the vacuum chamber. At the same time, the woven polyethylene web moves over a chill roller at a specified speed. The temperature of the chill roller, which is substantially lower than the temperature of the heated elements, is imparted to the web of woven polyethylene. The aluminum wire evaporates due to the heated elements, and sublimes into a vapor. The aluminum vapor immediately adheres and solidifies on the surface of the woven polyethylene web under the influence of an electric charge.

The aluminum evaporation rate is controlled, whereby a uniform layer of aluminum is dispersed on the web. The thickness of the aluminum material layer varies by specification. Since the coating of aluminum is relatively thin, the gauge or thickness of the woven polyethylene web does not materially change. In practice, it has been noted that four pounds of aluminum can cover 72,000 square feet of woven polyethylene web material.

In the embodiment of FIG. 2, for maximum reflectivity, the aluminum coating 28 adhered to woven polyethylene layer 24 is not coated with any other clear material, leaving the aluminum coating 28 exposed to heat rising through the blanket, as will be explained. It is also contemplated that other reflective materials can be used to create the reflective surface 28 of the present invention.

Generally, the insulative layer 16 is preferably constructed of an assembly of clear plastic comprising a plurality of air-filled heat absorbing insulative pockets 18 or like insulative elements, as illustrated in FIG. 2, preferably extending vertically from the surface of insulative layer 16 approximately a one-quarter to one-half inch. The air-filled insulative pockets 18 may be constructed of any shape or height according to the specifications of the cure blanket 10. In the preferred embodiment, each air-filled insulative pocket 18 encapsulates a particular volume of air. The air-filled insulative pockets 18 are disposed in a predetermined spaced relation to each other on the surface of the insulative layer 16, defining open spaces 30 between each pocket. Accordingly, the insulative layer 20 serves a dual purpose along its entire length and width by means of the combination of the insulative air pockets 18 and the open spaces 30, namely to create a heat transfer path allowing heat radiating from the surface of the concrete, or heat reflected from reflective surface 28, to pass through open spaces 30, and to constitute an effective insulation barrier as a result of the air-filled pockets 18. Accordingly, the result is that the entire insulative layer 16 functions both as an effective insulation barrier to radiant heat loss and as a means to allow reflected heat to pass back toward the curing concrete after being reflected off aluminum reflective coating 28, as will be explained. This serves to improve the thermal effectiveness and efficiency of the cure blanket 10 without a corresponding increase in the thickness or weight of the blanket. If desired, additional co-extensive insulative layers 16 as described above can be included in blanket 10, providing a corresponding increase in thermal retention capabilities, while resulting in only minimal increases in weight and thickness of the blanket 10.

The winter concrete cure blanket 10 illustrated in FIG. 2 also includes bottom outer layer 22, which comprises a woven polyethylene layer 32 having a thin coat or surface 34 of polyethylene. Layer 32 and coat 34 are heat sealed together to provide a moisture barrier. Insulative layer 16 is disposed in chamber 35, which is formed between top outer layer 14 and bottom outer layer 22.

A reflective aluminum coat or surface 36 is applied to the opposite side of woven polyethylene layer 32 from coat 34. Aluminum coat 36 is applied to woven polyethylene layer 32 in the same manner aluminum surface 28 was described above as being applied to woven polyethylene layer 24.

Aluminum coat 36, as illustrated in FIG. 2, is applied to the outward or downward facing surface of woven polyethylene layer 32, and is covered by a thin coat 38 of heat permeable clear polyethylene. In a preferred embodiment, clear polyethylene coat 38 is approximately one mil in thickness. The chemicals inherent in the concrete slab 20 have a tendency to react with aluminum if brought into direct contact with the aluminum coat 36, which would turn the aluminum soft and adversely affect the heat reflective capabilities of the blanket 10. The clear polyethylene coat 38 protects the aluminum coating 38 by preventing direct contact between the aluminum coating and the harmful chemicals in the concrete slab 10. It has been noticed that the clear polyethylene coat 38 slightly diminishes the reflectivity of aluminum coat 36, however, the tradeoff in overall efficiency and operability of the blanket 10 for its intended purpose is acceptable in view of the deterioration that would occur in the absence of a protective layer over the aluminum coat 36. Additionally, the underside of the blanket 10 provided by clear polyethylene coating 38 can be wiped off and cleaned after each use to protect the blanket, and to provide a fresh, clean blanket for ensuing applications. In practice, applicant has noted that a concrete cure blanket configured as shown in FIG. 2 and having two coextensive insulative layers 16 can provide an R factor of approximately 7.6.

In operation, referring to FIG. 2, when the blanket 10 is placed over concrete slab 20, heat emanating from the concrete curing process radiates upward from concrete slab 20 towards the underside of blanket 10, as depicted by arrows 40. A portion of this heat is reflected downward from aluminum coating 36 of bottom outer layer 22 of blanket 10, as depicted by arrows 42, and this heat is re-applied to the concrete to help maintain the concrete at a warmer temperature had the heat represented by arrows 42 been allowed to evaporate into the atmosphere.

An additional portion of the heat 40 emanating from concrete slab 20 passes through bottom outer layer 22 of blanket 10, and reaches insulative layer 16. In the embodiment illustrated in FIG. 2, the blanket 10 comprises a single insulative layer 16, however, a plurality of insulative layers 16 may be provided. The heat reaching insulative layer 16 either passes relatively rapidly through the spaces 30 between air filled insulative pockets 18, as depicted by arrows 44, or is retained for a longer period of time by means of air filled pockets 18. Insulative layer 16 is composed of a clear material to allow heat to readily pass through the open spaces 30. A substantial portion of the heat passing through insulative layer 16 is ultimately reflected off of aluminum surface 28 on the underside of top outer layer 14 and is directed downward as depicted by arrows 46. As set forth above, aluminum surface 28 is not covered by a coating of clear polyethylene, or any other material, to take maximum advantage of the reflective quality of the exposed aluminum coating 28. The downwardly reflected heat passes readily through insulative layer 16 via open spaces 30, and migrates downward through bottom outer layer 22 of blanket 10 until this reflective heat also reaches concrete slab 20.

Since no heat insulating blanket provides one hundred percent thermal efficiency, a certain portion of the heat radiating from concrete slab 20 passes entirely through blanket 10 and into the surrounding atmosphere. However, testing has shown that the concrete curing blanket 10 provides higher thermal retention efficiency, as measured by increased R factors, compared to other known thermal blankets used in the concrete industry of comparable thickness and weight. As discussed above, the number of heat insulative layers 16 in blanket 10 can be varied, and as will be discussed below in conjunction with further embodiments of the present invention. Insulative layers of other materials can also be utilized to provide a heat reflective concrete winter curing blanket having increased thermal efficiency.

The top outer layer 14, the insulative layer 16, and the bottom outer layer 22 are all integrally sealed together or bonded at their outer edge boundaries by heat sealing or other techniques that are well known to one of ordinary skill in the art. This bonding produces a unitary, single piece heat reflective concrete cure blanket 10 which is air and moisture tight.

Figure 3:
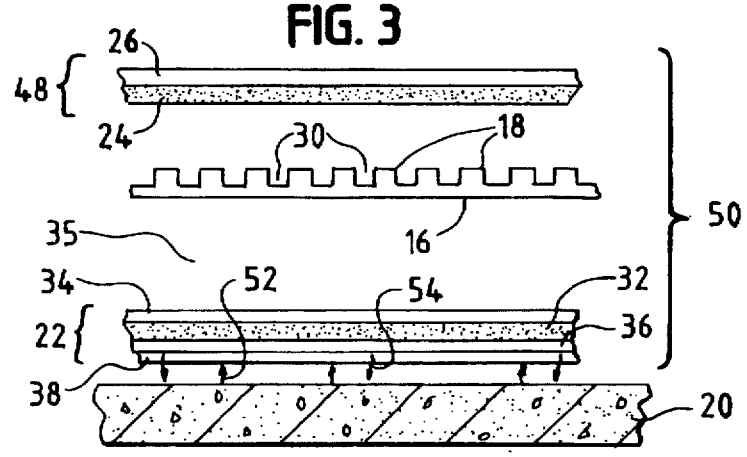
FIG. 3 is an expanded diagrammatic cross-sectional view of an additional embodiment of the lightweight, multilayer, heat reflective concrete cure blanket of the present invention, including an insulating medial comprising air filled insulating elements with spaces between the insulating elements.

FIG. 3 illustrates a further embodiment of the present invention wherein a reflective surface is only applied to the bottom outer layer of the concrete curing blanket, and the reflective layer applied to the top outer layer is eliminated. This blanket has a lower heat retention value than the blanket illustrated in FIG. 2, however, the blanket of FIG. 3 is less expensive to produce.

Referring to FIG. 3, top outer layer 48 of blanket 50 is comprised of a woven polyethylene layer 24, and a polyethylene coating 26 heat sealed or otherwise suitably bonded to the woven polyethylene layer 24. Beneath the top outer layer 48 in chamber 35 is an insulative layer 16 having air filled insulative pockets 18 and open spaces 30 disposed between the air filled pockets 18.

The bottom outer layer 22 of blanket 50 is constructed the same as bottom outer layer 22 of blanket 10 illustrated in FIG. 2, i.e., a coating 34 of polyethylene material adhered to a woven polyethylene layer 32, a reflective aluminum coat 36 applied to the opposite side of woven polyethylene layer 32 using the process described above, and a clear polyethylene protective coat 38 disposed over aluminum coat 36.

In the embodiment of the invention illustrated in FIG. 3, the heat from the concrete slab 20, represented by arrows 52, rises to contact reflective aluminum coat 36, where a substantial portion of the heat is reflected downward towards the concrete slab 20, as depicted by arrows 54. As with the embodiment of the invention illustrated in FIG. 2, the clear polyethylene coat 38 in the embodiment of FIG. 3 protects the aluminum coat 36 from dirt and from being attacked by chemicals in the concrete, which are known to have an adverse affect on aluminum which comes into contact with such chemicals.

Figure 4:
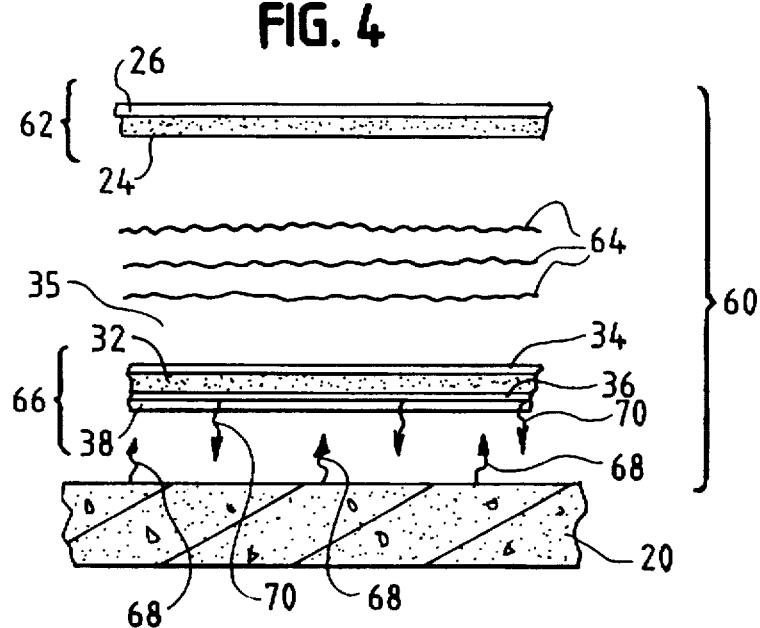
FIG. 4 is an expanded diagrammatic cross-sectional view of a further embodiment of the lightweight, multilayer, heat reflective concrete cure blanket of the present invention, including insulating media comprising heat absorbing foam material.

In the embodiment of the present invention illustrated in FIG. 4, the blanket 60 comprises a top outer layer 62 in chamber 35 having a woven polyethylene layer 24 heat sealed or otherwise suitably bonded to a polyethylene coating 26 to form a moisture proof and strong top outer layer of the blanket. Beneath the top outer layer 62 are a plurality of layers 64 of closed cell foam which provide the heat insulating media for the embodiment of the invention illustrated in FIG. 4. In this embodiment, the insulating media comprises three foam layers 64, each layer 64 consisting of ¼ inch closed cell foam of a type well known in the relevant art as an insulating medium. It is understood, however, that this embodiment of the invention can incorporate one or any reasonable number of layers 64 of closed cell foam material, or other suitable insulating material, as required to produce the desired insulative or R factor for the blanket 60. For example, blankets 60 constructed in accordance with the teachings of the present invention, including a reflective coating on the bottom outer layer 66 as will be explained, have produced R factors of 5.61 with a single layer 64 of quarter inch closed cell foam, R factors of 6.17 with two layers 64 of quarter inch (totalling one half inch) closed cell foam, and R factors of 6.96 with three layers 64 of quarter inch (totalling three quarter inch) closed cell foam.

The bottom outer layer 66 in FIG. 4 comprises a woven polyethylene layer 32 having a polyethylene layer 34 heat sealed or otherwise suitably bonded to layer 32 to form a moisture proof and strong woven polyethylene structure. On the outer face of woven polyethylene layer 32, a reflective an aluminum coat 36 is applied in accordance with the process set forth above in describing the blanket 10 of FIG. 2. A clear polyethylene protective coat 38 is disposed over aluminum coat 36 to protect the aluminum coat from the harmful effects of dirt and adversely acting chemicals present in concrete slab 20.

In the embodiment of the invention illustrated in FIG. 4, the heat from the concrete slab 20, represented by arrows 68, rises to contact reflective aluminum coat 36. A substantial portion of the heat is reflected downward back towards the concrete slab 20, as depicted by arrows 70. The remaining heat which is not reflected downward by aluminum coat 36 rises until it contacts foam media layers 64 which absorb a significant amount of the remaining heat and retain the heat in the blanket according to well known heat insulating principles.

In the embodiment illustrated in FIG. 4, a coating of reflective aluminum has been omitted from the underside of outer top layer 62 of blanket 60. This is because empirical data has shown that the heat reflected downward from such an aluminum surface would have to penetrate the layer or layers 64 of closed cell foam before such heat can reach concrete slab 10. However, the insulative characteristics which make foam layers 64 desirable insulative layers by absorbing heat would also make it difficult for heat to pass through layers 64 in a downward direction as viewed in FIG. 4, and ultimately migrate to concrete slab 20. It has been noted through testing that heat passes more readily through spaces 30 in bubble type insulative layer 16 (FIGS. 1, 2, 3) compared to heat passing through air filled spaces 18 (FIGS. 1, 2, 3) or through single or multiple layers 64 of foam (FIG. 4). However, there may be situations where it is desirable to apply an aluminum coat 28 (FIG. 2) on the inside surface of woven polyethylene layer 24 of blanket 60 in the embodiment of FIG. 4, keeping in mind the cost parameters involved in the application of the aluminum coating compared to the degree of increased heat insulative benefits provided by the blanket 60.

Figure 5:
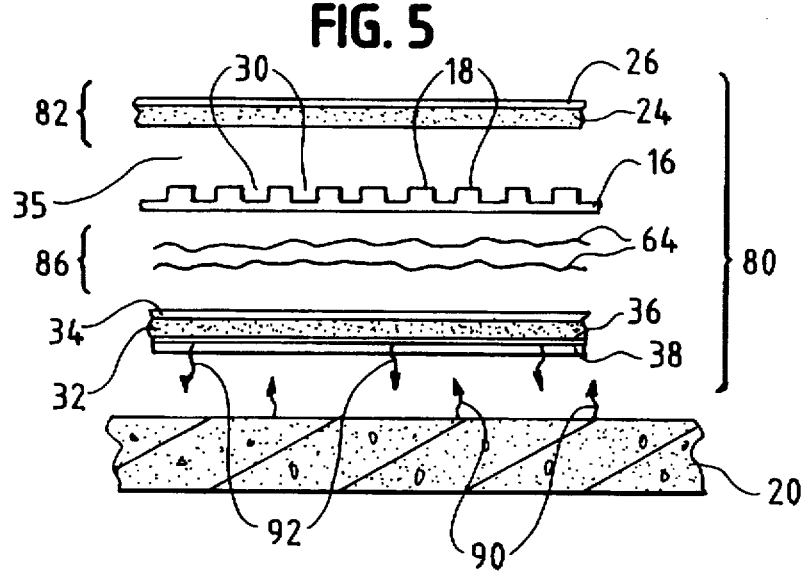
FIG. 5 is an expanded diagrammatic cross-sectional view of another embodiment of the lightweight, multilayer, heat reflective concrete cure blanket of the present invention.

A further embodiment of the invention is illustrated in FIG. 5, where the heat insulative blanket 80 has a top outer layer 82 comprising a woven polyethylene layer 24 and a polyethylene coating 26 sealed or otherwise suitably bonded to the woven polyethylene layer 24. Beneath top outer layer 82 in chamber 35 is a first insulative layer 16 comprising air filled insulative pockets 18 and open spaces 30 disposed between pockets 18. Although only one insulative layer 16 is shown, a plurality of insulative layers 16 may be included in the blanket of the embodiment.

Beneath first insulative layer 16 is a second insulative layer 86 comprising one or a plurality of closed cell foam insulating material layers 64. In the embodiment illustrated in FIG. 5, two foam layers 64 are disposed in chamber 35, however one or several layers 64 of foam insulating material can be disposed in the blanket 80 to produce the desired insulative or R factor.

The bottom outer layer 88 of blanket 80 is constructed the same as bottom outer layers 22 and 66 as shown in FIGS. 3 and 4, respectively, and as described above.

In the embodiment of the invention illustrated in FIG. 5, heat from concrete slab 20, represented by arrows 90, rises to contact aluminum reflective surface 36, where a substantial portion of the heat is reflected downward back to the concrete 20, as depicted by arrows 92. The clear polyethylene coat 38 protects the aluminum coat 36 from dirt and from being attacked by chemicals in the concrete, which chemicals could adversely affect the reflective qualities of the blanket were these chemicals to come into contact with the aluminum coat 36.

As with the embodiment of the invention illustrated in FIG. 4, in the embodiment of FIG. 5 a reflective coating of aluminum has been omitted from the underside of top layer 82 of blanket 80. This is the result of the inclusion in blanket 80 of a layer 64, or a plurality of layers 64, as an insulating medium in the blanket. As stated previously, layers 64 of closed cell foam have a tendency to absorb and retain heat, rather than let heat pass through the insulating medium in the manner that heat passes through open spaces 30 in insulative layer 16. Empirical data has shown that the heat that would be reflected from a reflective aluminum layer affixed to the underside of top layer 82 would have difficulty penetrating foam layer 86 to a significant degree to warrant the cost of adding an aluminum layer to top outer layer 82. However, depending upon the circumstances, certain constructions of blankets 80 may benefit from having a reflective aluminum layer form the underside of outer top layer 82.

Figure 6:
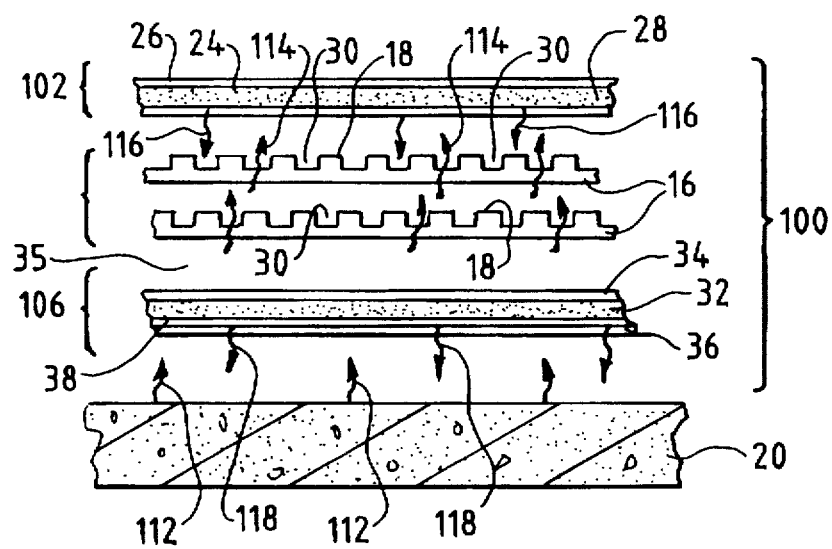
FIG. 6 is an expanded diagrammatic cross-sectional view of an additional embodiment of the lightweight, multilayer, heat reflective concrete cure blanket of the present invention.

A further embodiment of the present invention is disclosed in FIG. 6, wherein blanket 100 comprises a top outer layer 102 comprising a woven polyethylene layer 24, and a polyethylene coating 26 heat sealed or otherwise bonded to the woven polyethylene layer 24. The underside of woven polyethylene layer 24, as viewed in FIG. 6, comprises a reflective aluminum coat 28 which is applied to woven polyethylene layer 24 in the same manner as described above in conjunction with the description of FIG. 1. The aluminum coat 28 is disposed inside the central chamber 35 formed between top upper layer 102 and bottom outer layer 106, and faces the concrete slab 20. Since the blanket 100 comprises a moisture-proof construction around the chamber 35, dirt and debilitating chemicals cannot contact aluminum coat 28, and therefore no polyethylene or other coat need be applied over aluminum coat 28.

Beneath top outer layer 102 and above bottom outer layer 106, and disposed in chamber 35 are a plurality of insulative layers 16. In the disclosed embodiment of FIG. 6, two insulative layers 16 are shown, however, the blanket 100 may include more than two insulative layers 16 to provide a proper balance between weight, cost, and the insulative or R factor desired.

As with the embodiment of FIG. 3, each insulative layer 16 of FIG. 6 includes air filled insulative pockets 18 and open spaces 30 disposed between the air filled pockets 18. Heat rising upward through blanket 100 is impeded by the insulative characteristics of air filled pockets 18. However, rising heat can move more readily through open spaces 30 disposed between insulative air filled pockets 18.

Figure 7:
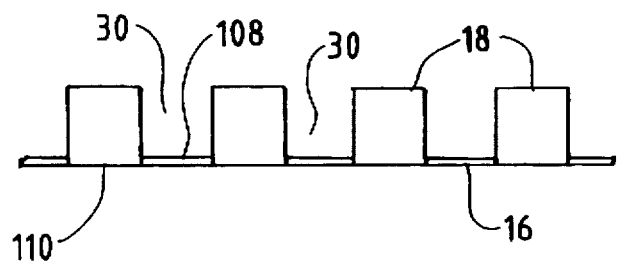
FIG. 7 is a detail view of a portion of one of the insulating media used in certain embodiments of the present invention.

FIG. 7 is a detailed cross-sectional view of one type of insulative layer 16 in a non-exploded condition. The layer 16 is composed of an upper sheet 108 in which pockets 18 are formed. A lower sheet 110 is heat sealed or otherwise bonded to the underside of sheet 108 in the areas beneath open spaces 30. Air is trapped in pockets 18 and provides the insulative properties of the layer 16.

Referring to FIG. 6, a significant portion of the heat rising from the concrete slab 20, depicted by arrows 112, is reflected off of aluminum coat 36, which forms part of bottom outer layer 106. Polyethylene layer 38 protects aluminum coat 36 from dirt and debilitating chemicals. Arrows 118 represent heat reflected off of aluminum coat 36, which heat is directed back to concrete slab 20.

Additional heat rises through bottom outer layer 106, and a portion of this heat is partially retained by air pockets 18 in insulative layers 16. Another portion of the heat, shown by arrows 114, rises through the open spaces 30 in insulative layer 16, and is reflected off aluminum coat 28, which forms part of top outer layer 102. This reflected heat is shown by arrows 116, which depict that the reflected heat is now directed downward towards concrete slab 20. This reflected heat 116 passes downward through open spaces 30 of each insulative layer 16, and ultimately through bottom outer layer 106 and to concrete slab 20, as depicted by arrows 118. The plurality of insulative layers 16 in blanket 100 add to the insulative or R factor of the blanket, while not significantly adding weight or detracting from the ability of the heat 116 to pass through the open spaces 30 of insulative layers 16.

Referring to FIG. 5, a single layer 16 of insulative material is shown. However, to the extent cost and weight restrictions allow, additional insulative layers 16 may be included in this embodiment of the invention to produce a higher insulative or R factor.

Each of the embodiments of the present invention provide at least one reflective surface formed in both the top and bottom outer layers of a concrete cure blanket, or a reflective layer in just the bottom outer layer of a concrete cure blanket.

Also, it is understood that suitable reflective materials other than aluminum may be used to provide the heat reflective surfaces and coatings comprising a feature of the several embodiments of the present invention. Variations of types and quantities of insulative media layers employed in conjunction with the reflective surface or surfaces have also been illustrated and described. The concrete cure blankets described herein effectively retard or prevent the evaporation of moisture necessary to ensure that the cured concrete is sufficiently durable and water-tight following the curing period without the necessity of re-wetting the concrete. The heat reflective structure of the present invention is highly efficient and cost effective, and produces a concrete cure blanket with increased thermal efficiency.

Although the foregoing detailed description of the present invention has been described by reference to various embodiments, and the best mode contemplated for carrying out the present invention has been herein shown and described, it will be understood that modifications or variations in the structure and arrangement of these embodiments other than those specifically set forth herein may be achieved by those skilled in the art and that such modifications are to be considered as being within the overall scope of the present invention. Therefore, it is contemplated to cover the present invention and any and all modifications, variations, or equivalents that fall within the true spirit and scope of the underlying principles disclosed and claimed herein. Consequently, the scope of the present invention is intended to be limited only by the appended claims.

I claim:

1. A lightweight multilayer heat reflective concrete cure blanket comprising:
    a moisture impervious first top outer layer;
    a moisture impervious second bottom outer layer disposed in spaced relation to said first top layer, said first and second layers sealingly connected to each other at the boundaries of said layers to form a moisture-impervious chamber between said first and second layers;
    at least one heat insulative layer disposed in said chamber between said first and second layers; and
    said second bottom layer comprising a woven material having an upper and lower surface, a heat reflective material applied to the lower surface of said woven material to reflect heat emanating from the concrete when the blanket is placed over concrete, and a protective heat permeable layer over said heat reflective material to protect the heat reflective material from chemicals and dirt in the concrete.

2. The concrete cure blanket of claim 1, including:

a second heat reflective material applied to a surface of the first top outer layer, said second heat reflective coat reflecting additional heat emanating from the concrete and back towards the concrete, which additional heat has passed through the at least one heat insulative layer in the chamber of the concrete cure blanket.

3. The concrete cure blanket of claim 1 wherein said first top outer layer comprises a layer of woven polyethylene and a coat of polyethylene in sealing contact with the woven polyethylene layer.

4. The concrete cure blanket of claim 1 wherein said at least one heat insulative layer comprises a plurality of insulative elements disposed in spaced relation to each other on at least one surface of said insulative layer, with spaces defined in said at least one insulative layer between said insulative elements, said insulative elements adapted to substantially retain heat and said spaces adapted to substantially form a heat transfer path through a portion of said insulative layer.

5. The concrete cure blanket of claim 4 including:
    a second heat reflective material applied to a surface of the first top outer layer which surface faces said chamber, said second heat reflective material reflecting heat passing through said at least one insulative layer back through said spaces in said at least one insulative layer in a direction towards said concrete.

6. The concrete cure blanket of claim 1 wherein said heat reflective material comprises an aluminum coating.

7. The concrete cure blanket of claim 2 wherein said first and second heat reflective materials are disposed to reflect heat in the same direction.

8. The concrete cure blanket of claim 4 including a second heat reflective material applied to a surface of said first top outer layer, said surface facing said chamber;
    a portion of the heat radiating from said concrete passing through the spaces defined in said at least one insulative layer and reflecting off of said second heat reflective material, said reflected heat from said second heat reflecting material passing through said spaces in a direction toward said concrete.

9. The concrete cure blanket of claim 4 wherein said at least one heat insulative layer comprises a plurality of heat insulative layers disposed in said chamber, each of said heat insulative layers comprising a plurality of insulative elements disposed in spaced relation to each other on at least one surface of said insulative layer, with spaces defined in each of said insulative layers between said insulative elements, said insulative elements adapted to substantially retain heat and said spaces adapted to substantially form a heat transfer path through a portion of each said insulative layer.

10. The concrete cure blanket of claim 1 wherein said heat insulative layer comprises foam insulating material.

11. The concrete cure blanket of claim 1 wherein said heat insulative layer comprises a plurality of foam insulating elements.

12. The concrete cure blanket of claim 1 wherein said heat insulative layer comprises at least one insulative layer having a plurality of insulative elements disposed in spaced relation to each other on at least one surface of said insulative layer, with spaces defined in each of said insulative layers between said insulative elements; and
    at least one insulative layer composed of foam material.

13. The concrete cure blanket of claim 1 wherein said woven material is comprised of polyethylene.

* * * * *